(12) United States Patent
Yamamoto (10) Patent No.: US 10,897,160 B2
(45) Date of Patent: Jan. 19, 2021

(54) POWER TRANSMISSION APPARATUS AND CONTROL METHOD OF THE SAME

(71) Applicant: CANON KABUSHIKI KAISHA, Tokyo (JP)

(72) Inventor: Yukinori Yamamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 368 days.

(21) Appl. No.: 15/941,138

(22) Filed: Mar. 30, 2018

(65) Prior Publication Data
US 2018/0287429 A1  Oct. 4, 2018

(30) Foreign Application Priority Data
Apr. 4, 2017 (JP) ................. 2017-074749

(51) Int. Cl.
*H02J 50/23* (2016.01)
*H02J 50/40* (2016.01)
*H02J 50/80* (2016.01)
*H02J 7/00* (2006.01)

(52) U.S. Cl.
CPC .............. *H02J 50/23* (2016.02); *H02J 50/40* (2016.02); *H02J 50/80* (2016.02); *H02J 7/00045* (2020.01); *H02J 2207/10* (2020.01)

(58) Field of Classification Search
None
See application file for complete search history.

(56) References Cited

U.S. PATENT DOCUMENTS

| 9,893,768 B2 * | 2/2018 | Leabman ............ H02J 7/00045 |
| 10,263,432 B1 * | 4/2019 | Leabman ................ H02J 50/20 |
| 2018/0351406 A1 * | 12/2018 | Lee ......................... H02J 50/12 |

FOREIGN PATENT DOCUMENTS

| JP | 2013-538548 A | 10/2013 |
| WO | 2012/027166 A1 | 3/2012 |

* cited by examiner

*Primary Examiner* — Jared Fureman
*Assistant Examiner* — Joel Barnett
(74) *Attorney, Agent, or Firm* — Cowan, Liebowitz & Latman, P.C.

(57) ABSTRACT

A power transmission apparatus that supplies power in a non-contact manner to a plurality of power reception apparatuses, acquires movement information regarding the power reception apparatuses, and controls, in accordance with the movement information, power transmission processing and adjustment processing for adjusting a direction in which the power is transmitted. The power transmission apparatus performs control such that, in a case of transmitting power to a moving power reception apparatus, the adjustment processing is performed before the power transmission processing is performed, and in a case of transmitting power to a stationary power reception apparatus, the adjustment processing is performed before the power transmission processing is performed, and thereafter the power transmission processing is performed without performing the adjustment processing until the stationary power reception apparatus changes to a moving state.

18 Claims, 9 Drawing Sheets

| POWER TRANSMISSION 1 | C2 | POWER TRANSMISSION 2 | C1 | POWER TRANSMISSION 1 | C2 | POWER TRANSMISSION 2 |

FIG. 5B

| C1 POWER TRANSMISSION 1 |

FIG. 5C

| POWER TRANSMISSION 1 | C2 | POWER TRANSMISSION 2 | C1 | POWER TRANSMISSION 1 | C2 | POWER TRANSMISSION 2 |

FIG. 5D

| POWER TRANSMISSION 1 | C1 | POWER TRANSMISSION 1 | C1 | POWER TRANSMISSION 1 |

STATIONARY PERIOD

FIG. 6

POWER TRANSMISSION/RECEPTION MANAGEMENT TABLE

| POWER RECEPTION APPARATUS ID | MOVEMENT INFORMATION | POWER TRANSMISSION PERMISSION | ANTENNA SETTING VALUE | | | | DEVICE INFORMATION | USER PRIORITY | POWER TRANSMISSION/RECEPTION STATUS | |
|---|---|---|---|---|---|---|---|---|---|---|
| | | | ANT1 | ANT2 | ANT3 | ANT4 | | | POWER TRANSMISSION/RECEPTION EFFICIENCY | REMAINING BATTERY CAPACITY |
| RX1 | STATIONARY | PERMITTED | k11 | k12 | k13 | k14 | REMOTE CONTROL | LOW | 10% | 70% |
| RX2 | MOVING | PROHIBITED | k21 | k22 | k23 | k24 | SMARTPHONE | HIGH | 5% | 30% |
| RX3 | MOVING | PROHIBITED | k31 | k32 | k33 | k34 | MOUSE | HIGH | 4% | 10% |

POINTER →

| POWER RECEPTION APPARATUS (RX) TYPE | | POWER RECEPTION APPARATUS (RX) MOVEMENT INFORMATION | EXTERNAL CONDITION (INFORMATION REGARDING OTHER POWER RECEPTION APPARATUSES (RX) IN SYSTEM) | | |
|---|---|---|---|---|---|
| | | | STATIONARY POWER RECEPTION APPARATUS (RX) EXISTS | NO STATIONARY POWER RECEPTION APPARATUS (RX) | |
| | | | | TYPE 1 POWER RECEPTION APPARATUS (RX) EXISTS | ONLY TYPE 2 POWER RECEPTION APPARATUS (RX), OR NO OTHER POWER RECEPTION APPARATUSES (RX) |
| TYPE 1 (HIGH PRIORITY) | | STATIONARY | ○ | ○ | ○ |
| | | MOVING | ○ | ○ | ○ |
| TYPE 2 (LOW PRIORITY) | | STATIONARY | ○ | ○ | ○ |
| | | MOVING | × | × | ○ |

○ : POWER TRANSMISSION PERMITTED
× : POWER TRANSMISSION PROHIBITED

POWER TRANSMISSION APPARATUS AND CONTROL METHOD OF THE SAME

BACKGROUND OF THE INVENTION

Field of the Invention

The present invention relates to a power transmission apparatus and control method thereof, particularly relates to a non-contact power supply system that supplies power in a non-contact manner.

Description of the Related Art

In recent years, non-contact power supply systems are known in which instead of making a wired connection from a power reception apparatus to a power transmission apparatus, power is transmitted and received in a non-contact manner by electromagnetic induction, magnetic resonance, radio waves, or the like. With radio waves in particular, it is possible to increase the distance between the power transmission apparatus and the power reception apparatus, thus making it possible for a portable device such as a mobile telephone (e.g., a smartphone) or a digital camera that is the power reception apparatus to be charged while being carried around (Japanese Patent Laid-Open No. 2013-538548).

In the above-described case of using radio waves, the power transmission apparatus receives a calibration signal from the power reception apparatus in order to adjust the directivity of the power transmission array antenna before power transmission, and because the array antenna is used for both calibration signal reception and power transmission, power transmission is interrupted during calibration signal reception. Also, when multiple power reception apparatuses are moving, calibration signal transmission/reception and power transmission are successively performed as a basic cycle for each power reception apparatus, and thus there is an increase in the proportion of calibration signal transmission/reception relative to the power transmission period for the power reception apparatuses, and there is a decrease in the power transmission/reception efficiency per unit of time.

SUMMARY OF THE INVENTION

The present invention has been made in consideration of the aforementioned problems, and realizes a technique for reducing the execution frequency of processing performed before the transmission of power to a power reception apparatus, and improving the power transmission/reception efficiency in the overall system.

In order to solve the aforementioned problems, the present invention provides a power transmission apparatus comprising: a power transmission unit capable of supplying power in a non-contact manner to a plurality of power reception apparatuses; a communication unit capable of performing communication with the plurality of power reception apparatuses; and a control unit configured to acquire movement information regarding the power reception apparatuses via the communication unit, and control, in accordance with the movement information, power transmission processing performed by the power transmission unit and adjustment processing for adjusting a direction in which the power transmission unit transmits power, wherein the control unit performs control such that, in a case of transmitting power to a moving power reception apparatus, the adjustment processing is performed before the power transmission processing is performed, and in a case of transmitting power to a stationary power reception apparatus, the adjustment processing is performed before the power transmission processing is performed, and thereafter the power transmission processing is performed without performing the adjustment processing until the stationary power reception apparatus changes to a moving state.

In order to solve the aforementioned problems, the present invention provides a control method of a power transmission apparatus which has a power transmission unit capable of supplying power in a non-contact manner to a plurality of power reception apparatuses, and a communication unit capable of performing communication with the plurality of power reception apparatuses, the method comprising: acquiring movement information regarding the power reception apparatuses via the communication unit, and controlling, in accordance with the movement information, power transmission processing performed by the power transmission unit and adjustment processing for adjusting a direction in which the power transmission unit transmits power; and in the controlling, performing control such that, in a case of transmitting power to a moving power reception apparatus, the adjustment processing is performed before the power transmission processing is performed, and in a case of transmitting power to a stationary power reception apparatus, the adjustment processing is performed before the power transmission processing is performed, and thereafter the power transmission processing is performed without performing the adjustment processing until the stationary power reception apparatus changes to a moving state.

In order to solve the aforementioned problems, the present invention provides a non-transitory computer-readable storage medium storing a program for causing a computer to execute a control method of a power transmission apparatus which has a power transmission unit capable of supplying power in a non-contact manner to a plurality of power reception apparatuses, and a communication unit capable of performing communication with the plurality of power reception apparatuses, the method comprising: acquiring movement information regarding the power reception apparatuses via the communication unit, and controlling, in accordance with the movement information, power transmission processing performed by the power transmission unit and adjustment processing for adjusting a direction in which the power transmission unit transmits power; and in the controlling, performing control such that, in a case of transmitting power to a moving power reception apparatus, the adjustment processing is performed before the power transmission processing is performed, and in a case of transmitting power to a stationary power reception apparatus, the adjustment processing is performed before the power transmission processing is performed, and thereafter the power transmission processing is performed without performing the adjustment processing until the stationary power reception apparatus changes to a moving state.

In order to solve the aforementioned problems, the present invention provides a power transmission apparatus comprising: a plurality of antennas; a reception unit configured to receive a signal from a power reception apparatus; and a control unit configured to control output from the antennas such that power is wirelessly supplied to the power reception apparatus from the antennas, wherein the control unit alternatingly repeats determination processing for determining output from the antennas based on a signal received by the reception unit, and power transmission processing for wirelessly outputting power from the antennas in accordance with the output determined in the determination processing, and the control unit controls an execution frequency of the determination processing based on whether or not the power reception apparatus is moving.

In order to solve the aforementioned problems, the present invention provides a control method of a power transmission apparatus which has a plurality of antennas, a reception unit configured to receive a signal from a power reception apparatus, and a control unit configured to control output from the antennas such that power is wirelessly supplied to the power reception apparatus from the antennas, the method comprising: alternatingly repeating execution of determination processing for determining output from the antennas based on a signal received by the reception unit, and execution of power transmission processing for wirelessly outputting power from the antennas in accordance with the output determined in the determination processing, and controlling an execution frequency of the determination processing based on whether or not the power reception apparatus is moving.

In order to solve the aforementioned problems, the present invention provides a non-transitory computer-readable storage medium storing a program for causing a computer to execute a control method of a power transmission apparatus which has a plurality of antennas, a reception unit configured to receive a signal from a power reception apparatus, and a control unit configured to control output from the antennas such that power is wirelessly supplied to the power reception apparatus from the antennas, the method comprising: alternatingly repeating execution of determination processing for determining output from the antennas based on a signal received by the reception unit, and execution of power transmission processing for wirelessly outputting power from the antennas in accordance with the output determined in the determination processing, and controlling an execution frequency of the determination processing based on whether or not the power reception apparatus is moving.

According to the present invention, it is possible to reduce the execution frequency of processing performed before the transmission of power to a power reception apparatus, and improve the power transmission/reception efficiency in the overall system.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

System Configuration

Figure 1:
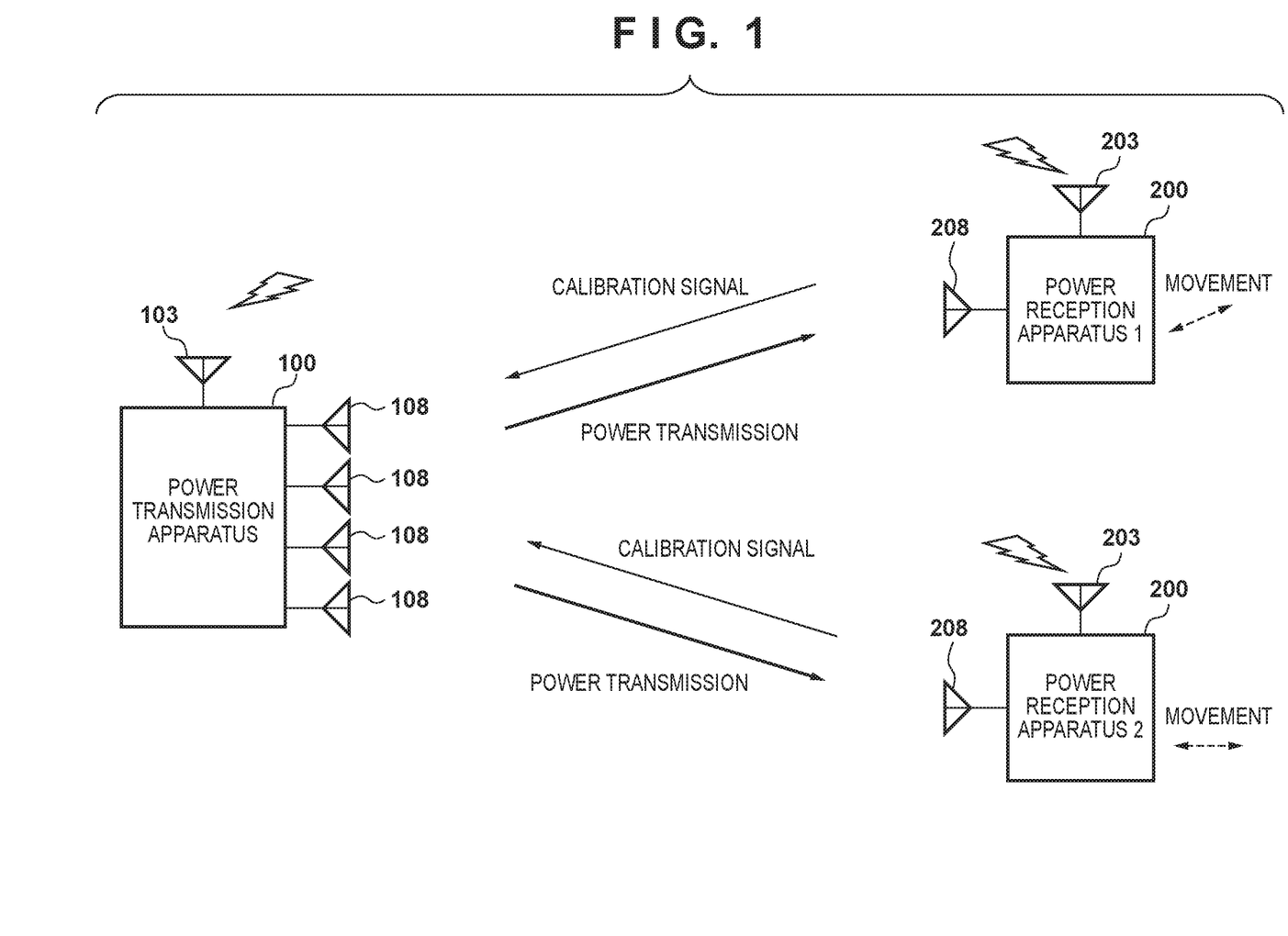
FIG. 1 is a diagram showing a configuration of a system of according to an embodiment.

First, the configuration of a non-contact power supply system according to the present embodiment will be described with reference to FIG. 1.

The non-contact power supply system of the present embodiment is constituted by one power transmission apparatus 100 and multiple power reception apparatuses 200. The power reception apparatuses 200 are portable devices that operate using an internal battery or the like and are carried around, and the internal battery can be charged by wirelessly receiving power from the power transmission apparatus 100, which is disposed in a room or the like. In order to receive power from the power transmission apparatus 100, the power reception apparatuses 200 first emit a radio wave called a calibration signal from a power reception array antenna 208. Note that the calibration signal is also called a beacon signal or a pilot signal. Upon receiving a calibration signal via an array antenna 108, the power transmission apparatus 100 detects the position and direction of the power reception apparatus 200 that transmitted the calibration signal, sets the directivity of the power transmission array antenna 108 to the detected direction, and then performs power transmission.

Also, the power transmission apparatus 100 and the power reception apparatuses 200 include communication antennas 103 and 203 for performing wireless communication with each other, and the frequency used in this wireless communication is different from the frequency used in power transmission/reception. Various processing is performed in this wireless communication, such as authentication processing between apparatuses, and processing for notifying the power transmission apparatus of the state of the power reception apparatus during power transmission.

Note that the power transmission apparatus 100 of the present embodiment may be an apparatus that is dedicated to power transmission, or may further include the functions of another apparatus. For example, the power transmission apparatus may have the functions of a light, air conditioner, clock, sprinkler, fire alarm, or the like, which are disposed in the vicinity of a ceiling. These apparatuses are normally apparatuses for spreading light, air, water, or the like throughout the entirety of a room, and therefore have a high possibility of being disposed at a location where radio waves are likely to reach the entirety of a room. Such apparatuses are thus likely to be disposed at a location that is preferable for the power transmission apparatus 100 of the present embodiment. Also, the power reception apparatuses 200 of the present embodiment may be an imaging apparatus such as a digital camera, a communication terminal such as a mobile phone (e.g., a smartphone), an information terminal such as a tablet computer, an electronic device such as a mobile media player that plays audio and/or video, a mouse, a speaker, or the like.

Apparatus Configuration

Figure 2A:
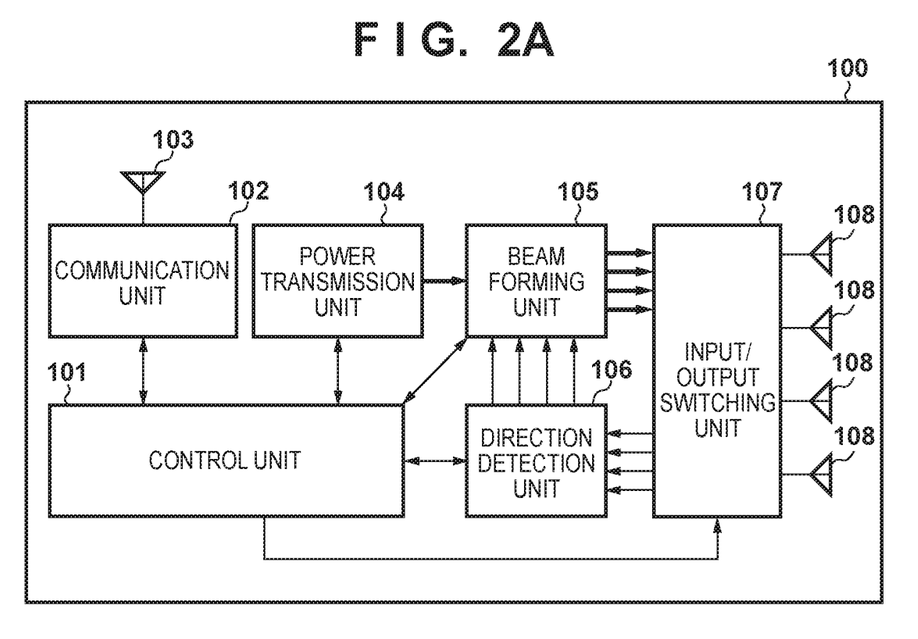
FIG. 2A is a block diagram showing a configuration of a power transmission apparatus according to the embodiment.
Figure 2B:
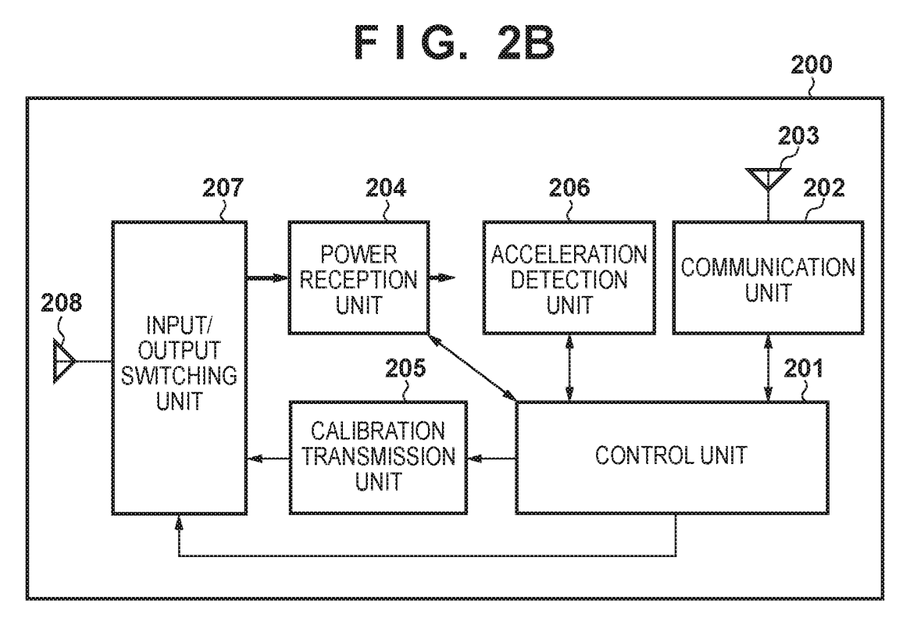
FIG. 2B is a block diagram showing a configuration of a power reception apparatus according to the embodiment.

Next, the configurations and the functions of the power transmission apparatus 100 and the power reception apparatuses 200 of the present embodiment will be described with reference to FIGS. 2A and 2B.

First, the configuration and the functions of the power transmission apparatus 100 will be described using FIG. 2A.

The power transmission apparatus 100 includes a control unit 101, a communication unit 102, a communication antenna 103, a power transmission unit 104, a beam forming unit 105, a direction detection unit 106, an input/output switching unit 107, and an array antenna 108.

The control unit 101 includes an arithmetic processing device such as a CPU, and performs overall control of the power transmission apparatus 100 by executing a control program that is stored in a storage apparatus such as a memory.

The communication unit 102 can perform wireless communication in compliance with IEEE 802.11 standards, IEEE 802.15 standards, or the like, and transmits and receives various types of data other than transmitted power to and from the power reception apparatuses 200 with use of the communication antenna 103. Communication processing performed via the communication antenna 103 will be described in detail later.

The power transmission unit 104 is a circuit that amplifies an AC (Alternating Current) signal for supplying AC power in a non-contact manner to a power reception apparatus 200 by emitting radio waves from the array antenna 108.

By adjusting the gain and phase of power supplied to the antennas that constitute the array antenna 108, the beam forming unit 105 determines, for the overall array antenna 108, the strength and directivity of radio waves that transmit power to the power reception apparatus 200.

The direction detection unit 106 is constituted by a DSP or the like, analyzes a calibration signal that is received from a power reception apparatus 200 via the array antenna 108, and detects the direction from which radio waves have arrived. The direction detection unit 106 also calculates a gain and a phase for each of the antennas that constituted the array antenna 108, and sets such values in the beam forming unit 105 such that power is transmitted in the radio wave arrival direction that has been detected.

The input/output switching unit 107 switches the array antenna 108 between a calibration signal reception mode and a power transmission mode. Under control of the control unit 101, the input/output switching unit 107 connects the array antenna 108 to the beam forming unit 105 in the transmission mode, and connects the array antenna 108 to the direction detection unit 106 in the reception mode.

The array antenna 108 receives calibration signals from the power reception apparatuses 200 and transmits power to the power reception apparatuses 200. The array antenna 108 is constituted by multiple antennas, and the larger the number of antennas is, the higher the precision is when detecting the radio wave arrival direction, and the higher the sharpness is for the directivity of power transmission.

Next, the configuration and the functions of a power reception apparatus 200 will be described using FIG. 2B.

The power reception apparatus 200 includes a control unit 201, a communication unit 202, a communication antenna 203, a power reception unit 204, a calibration transmission unit 205, an acceleration detection unit 206, an input/output switching unit 207, and an array antenna 208.

The control unit 201 includes an arithmetic processing device such as a CPU, and performs overall control of the power reception apparatus 200 by executing a control program that is stored in a storage apparatus such as a memory.

The communication unit 202 can perform wireless communication in compliance with IEEE 802.11 standards, IEEE 802.15 standards, or the like, and transmits and receives various types of data other than transmitted power to and from the power transmission apparatus 100 with use of the communication antenna 203. Communication processing performed via the communication antenna 203 will be described in detail later.

The power reception unit 204 receives, via the input/output switching unit 207, radio waves that were received by the array antenna 208, and rectifies the radio waves into a direct current to obtain DC (Direct Current) power. The power reception unit is often combined with an antenna and generally called a rectenna, but may be constituted by a Schottky diode or the like. Power obtained by the power reception unit 204 is supplied to the entirety of the power reception apparatus 200 or used to charge a secondary battery provided in the power reception apparatus 200.

The calibration transmission unit 205 transmits a calibration signal to the power transmission apparatus 100 before power is received from the power transmission apparatus 100. The calibration signal is a signal for notifying the position and the direction of the power reception apparatus 200 to the power transmission apparatus 100, and is generated as a carrier signal in a predetermined period. Here, the carrier signal is an unmodulated sinusoidal signal and has the frequency used for power transmission and reception. The calibration signal is transmitted by the array antenna 208 via the input/output switching unit 207.

The input/output switching unit 207 switches the array antenna 208 between a calibration signal transmission mode and a power reception mode. Under control of the control unit 201, the input/output switching unit 207 connects the array antenna 208 to the calibration transmission unit 205 in the transmission mode, and connects the array antenna 208 to the power reception unit 204 in the reception mode.

The array antenna 208 transmits the calibration signal to the power transmission apparatus 100 and receives power from the power transmission apparatus 100. In the present embodiment, the array antenna 208 is constituted by one antenna, and does not have strong directivity. Note that it is also possible to provide multiple antennas and control the directivity to improve the power transmission/reception efficiency, but in this case, control is performed to prevent the array antenna from having directivity at least during calibration signal transmission. This is necessary for allowing the power transmission apparatus 100 to correctly recognize the position and the direction of the power reception apparatus 200.

The acceleration detection unit 206 includes an acceleration sensor or the like for detecting movement of the power reception apparatus 200. Acceleration information detected by the acceleration detection unit 206 is transmitted from the control unit 201 to the power transmission apparatus 100 via the communication unit 202 and the communication antenna 203 as information for controlling power transmission and reception. Note that acceleration can only be detected if there is a change in speed, and therefore a configuration is possible in which an integrator or the like is provided, and the movement speed of the power reception apparatus 200 is detected as a numerical value.

Power Transmission/Reception Processing Sequence

Figure 3:
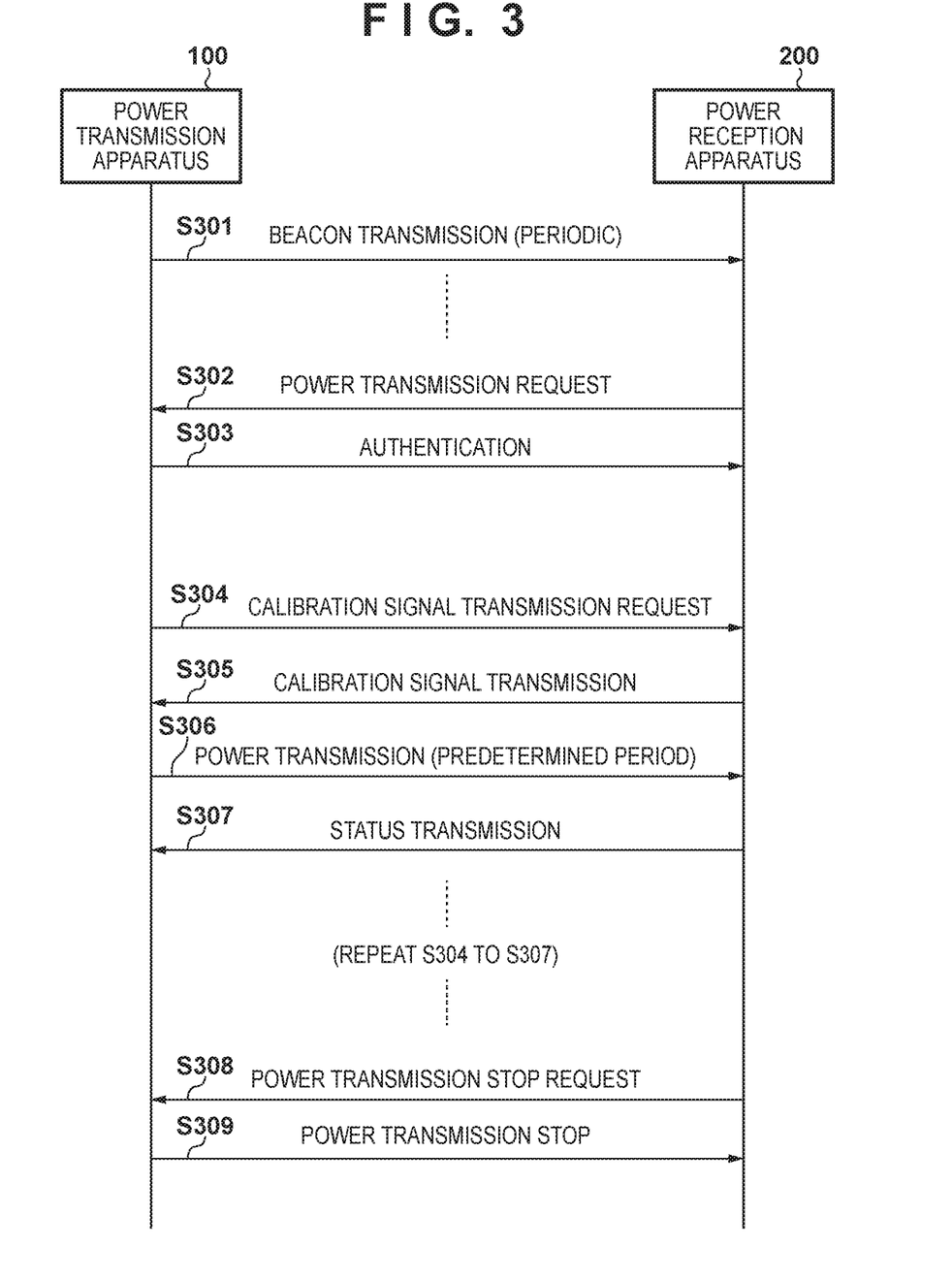
FIG. 3 is a diagram showing a sequence of power transmission/reception processing according to the embodiment.

The following describes operations from the start to the end of power transmission performed by the power transmission apparatus 100 and the power reception apparatus 200 of the present embodiment with reference to FIG. 3.

In step S301, the power transmission apparatus 100 periodically transmits a radio wave called a beacon signal. The beacon signal includes packets similar to an SSID transmitted by an access point in a wireless LAN. The beacon signal transmitted by the power transmission apparatus 100 indicates that the apparatus is an apparatus that provides a service capable of wirelessly supplying power.

In step S302, a power reception apparatus 200 in the receivable range of the beacon signal transmits a power transmission request. The power transmission request transmitted by the power reception apparatus 200 includes a communication address, model information, and parameters such as the power reception capacity of the power reception apparatus 200.

In step S303, the power transmission apparatus 100 checks the information included in the power transmission request, and then transmits authentication (power transmission permission) information to the power reception apparatus 200.

After authentication ends, in step S304, the power transmission apparatus 100 transmits a calibration signal transmission request to the power reception apparatus 200. There are cases where information such as a calibration signal frequency and transmission period is designated in the transmission request. In response to this, in step S305, the power reception apparatus 200 transmits a calibration signal in a predetermined period (which has been designated in the transmission request). Note that the calibration signal frequency and the later-described power transmission frequency are different from the communication frequency used in steps S301 to S304 described above.

In step S306, the power transmission apparatus 100 analyzes the calibration signal to detect the position and the direction of the power reception apparatus 200, and transmits power from the array antenna 108 in the detected direction for a predetermined period.

Upon receiving power, in step S307, the power reception apparatus 200 transmits status information such as the received power amount and remaining battery capacity to the power transmission apparatus 100. Note that although the status information is transmitted after the end of power transmission in step S306 in FIG. 3, it is desirable that the status of the power reception apparatus 200 is monitored multiple times at a short interval during power transmission. Also, the status information may be transmitted from the power reception apparatus 200 by interrupt transmission, or may be transmitted in response to periodic polling by the power transmission apparatus 100.

The processing of steps S304 to S307 described above is performed repeatedly, and then when the battery of the power reception apparatus 200 becomes fully charged, in step S308, the power reception apparatus 200 transmits a power transmission stop request to the power transmission apparatus 100.

Upon receiving the power transmission stop request from the power reception apparatus 200, in step S309, the power transmission apparatus 100 stops power transmission.

Note that the power transmission apparatus 100 may monitor the status of the power reception apparatus 200 by polling as described above, and independently stop power transmission without receiving the power transmission stop request.

Figure 4:
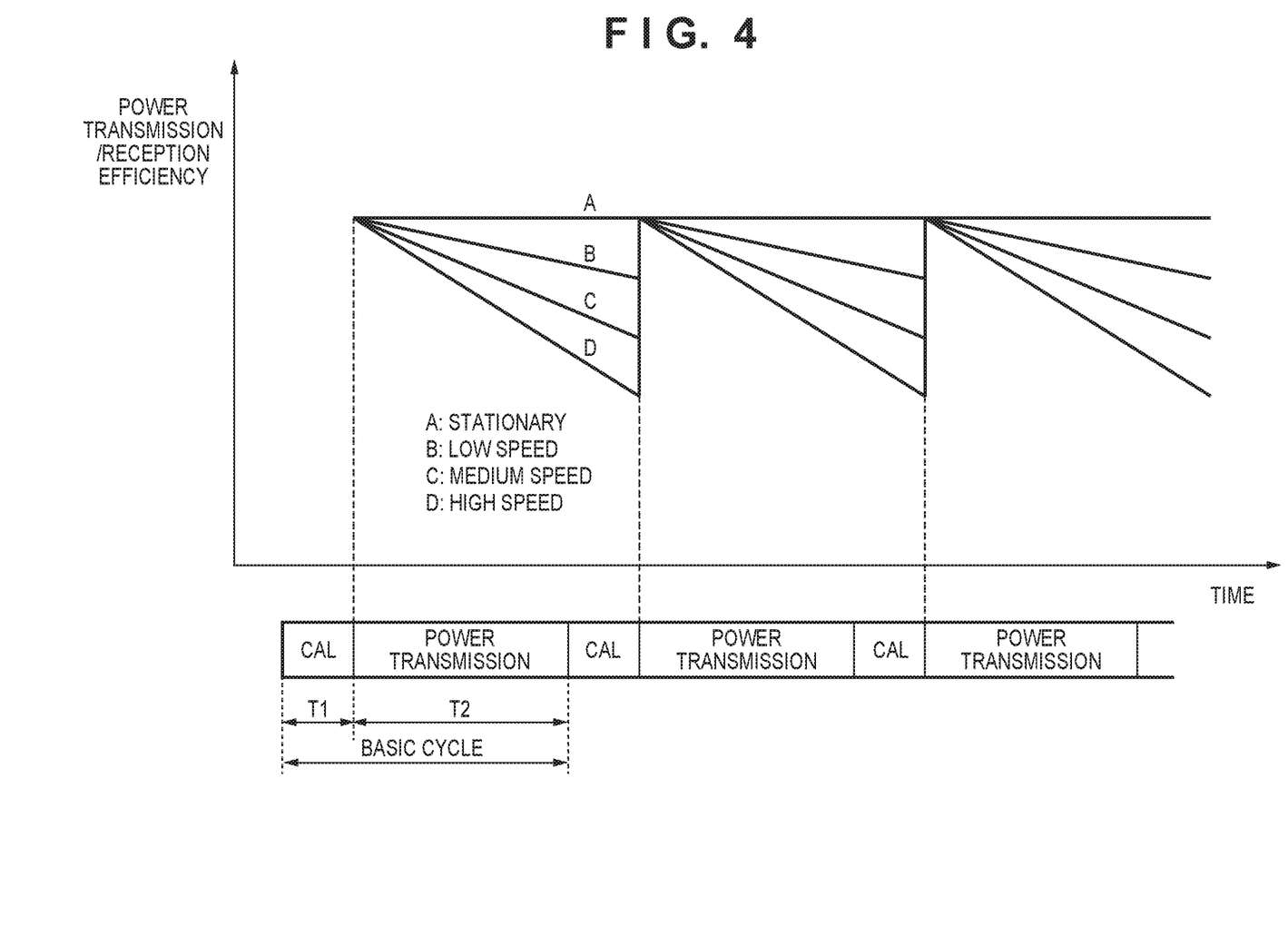
FIG. 4 is a diagram showing change in power transmission/reception efficiency over time.

The following describes change in power transmission/reception efficiency over time in the system of the present embodiment with reference to FIG. 4. In FIG. 4, the vertical axis indicates power transmission/reception efficiency, and the horizontal axis indicates time. Note that the power transmission/reception efficiency is a numerical value representing the ratio of power received by the power reception apparatus 200 to power transmitted by the power transmission apparatus 100.

The state where calibration (CAL) processing and power transmission are alternatingly performed is shown below the horizontal axis.

T1 indicates a CAL processing period, T2 indicates a power transmission period, and charging of the battery of the power reception apparatus 200 proceeds by repeatedly performing a basic cycle of T1+T2. Power transmission cannot be performed in the period T1 (fixed period), and therefore in order to raise the power transmission/reception efficiency, the period T2 (i.e., the basic cycle) needs to be set as long as possible.

Also, A, B, C, and D in the figure indicate extents of movement of the power reception apparatus 200, and indicate how the power transmission/reception efficiency correspondingly changes. Specifically, in the case of A in which the power reception apparatus 200 is stationary, the power transmission/reception efficiency is maintained without any reduction, whereas the power transmission/reception efficiency decreases with an increasingly large slope as the movement of the power reception apparatus 200 increases in speed (B, C, D). This is because the power transmission apparatus 100 precisely recognizes the position of the power reception apparatus 200 at the end of the CAL processing period T1, and can emit radio waves in that direction, but the more the power reception apparatus 200 moves thereafter, the greater the error in the radio wave emission direction becomes.

Accordingly, in order to raise the power transmission/reception efficiency, it is desirable to set the basic cycle T1+T2 to a long cycle and reduce the proportion of the CAL processing period T1, but in the case where the power reception apparatus 200 is moving quickly, the power transmission/reception efficiency decreases unless the basic cycle T1+T2 is set to a shorter cycle. In this way, it is important to appropriately control the basic cycle T1+T2 in accordance with the extent of movement of the power reception apparatus 200 that is power transmission target. For example, in the case where the target is a smartphone in a person's possession, it is conceivable to set the basic cycle T1+T2 in advance with sufficient consideration given to the range of speed of human movement.

Also, if the movement speed can be acquired from the power reception apparatus 200, it is possible to optimize the efficiency by dynamically changing the basic cycle T1+T2 in accordance with the movement speed value. Specifically, control can be performed such that the interval of CAL processing (adjustment processing) is set shorter the higher the movement speed is.

The following describes a method for shortening the CAL processing period T1 in the case of transmitting power to multiple (two in this example) power reception apparatuses 200 in the system of the present embodiment, with reference to FIGS. 5A to 5D. Two smartphones are envisioned as the power reception apparatuses 200, for example.

Figure 5A:
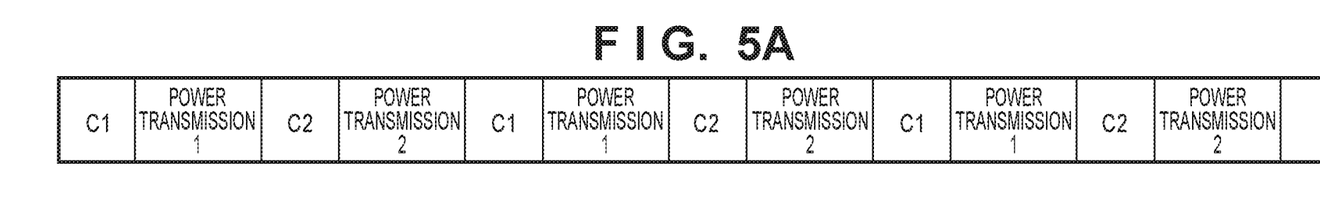
FIGS. 5A to 5D are diagrams illustrating a method for reducing the execution frequency of calibration processing according to the embodiment.

FIG. 5A is similar to the example in FIG. 4, two power reception apparatuses 200 are power transmission targets, and therefore the CAL processing period and the power transmission period of a power transmission apparatus 1 and a power reception apparatus 2 appear alternatingly. In FIGS. 5A to 5D, "C1" indicates the CAL processing period for the power reception apparatus 1, and "C2" indicates the CAL processing period for the power reception apparatus 2. Also, "power transmission 1" indicates the power transmission period for the power reception apparatus 1, and "power transmission 2" indicates the power transmission period for the power reception apparatus 2.

In FIG. 5A, it is assumed that the power reception apparatuses 1 and 2 are both moving, and as described with reference to FIG. 4, the power transmission/reception efficiency does not rise because the power transmission period cannot be set longer.

Figure 5B:
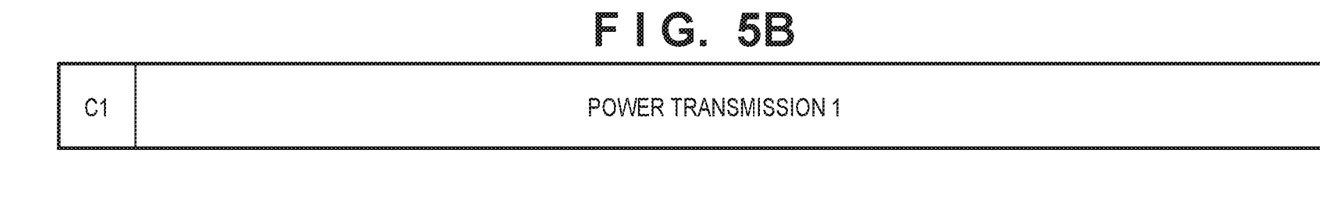

Here, if it is assumed that the power reception apparatus 1 is placed on a desk or the like and is stationary, operations are performed as shown in FIG. 5B. Specifically, the stationary power reception apparatus 1 is prioritized, and power transmission is temporarily stopped for the moving power reception apparatus 2. Accordingly, the position of the power reception apparatus 1 is determined by the transmission of the CAL signal merely a single time from the power reception apparatus 1, and therefore all of the periods thereafter can be set to power transmission periods for the power reception apparatus 1, and the power transmission/reception efficiency can be greatly improved.

Figure 5C:
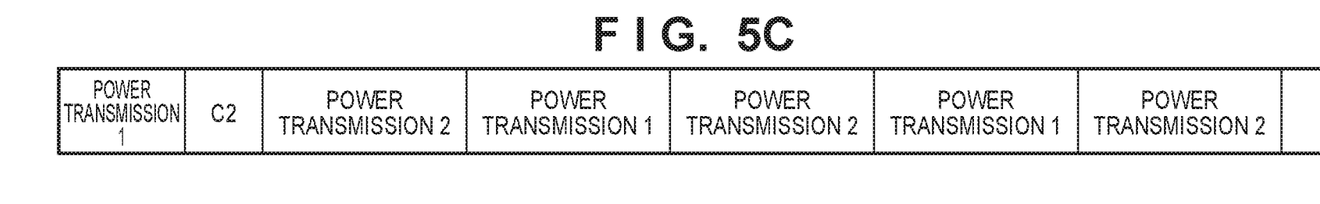

FIG. 5C shows the case where the power reception apparatus 2 thereafter becomes stationary as well. The CAL signal is transmitted one time from the power reception apparatus 2 as well, and thereafter power is transmitted alternatingly to the power reception apparatus 1 and the power reception apparatus 2. In this case as well, the period occupied by CAL processing is small, and the power transmission/reception efficiency is improved over that in FIG. 5A.

Figure 5D:
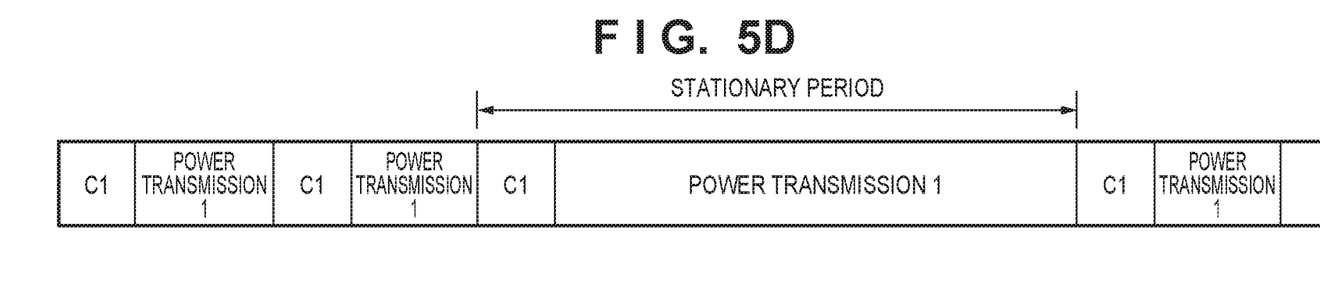

Lastly, FIG. 5D shows the case where only the power reception apparatus 1 is present, and is repeatedly stationary and moving. The CAL signal is transmitted at the basic cycle in the moving period, whereas the CAL signal is transmitted only the first time while stationary, and thereafter power transmission is performed in the stationary period. In this example as well, the proportion of the CAL processing is reduced compared to FIG. 5A, and the power transmission/reception efficiency is improved.

Note that although power transmission is always prioritized for a stationary power reception apparatus in the present embodiment, a configuration is possible in which instead of always stopping power transmission for a moving power reception apparatus, power is transmitted to the moving power reception apparatus if no other stationary power reception apparatus exists. In other words, if two power reception apparatuses are both moving, the power transmission/reception efficiency remains as-is as shown in FIG. 5A.

Figure 6:
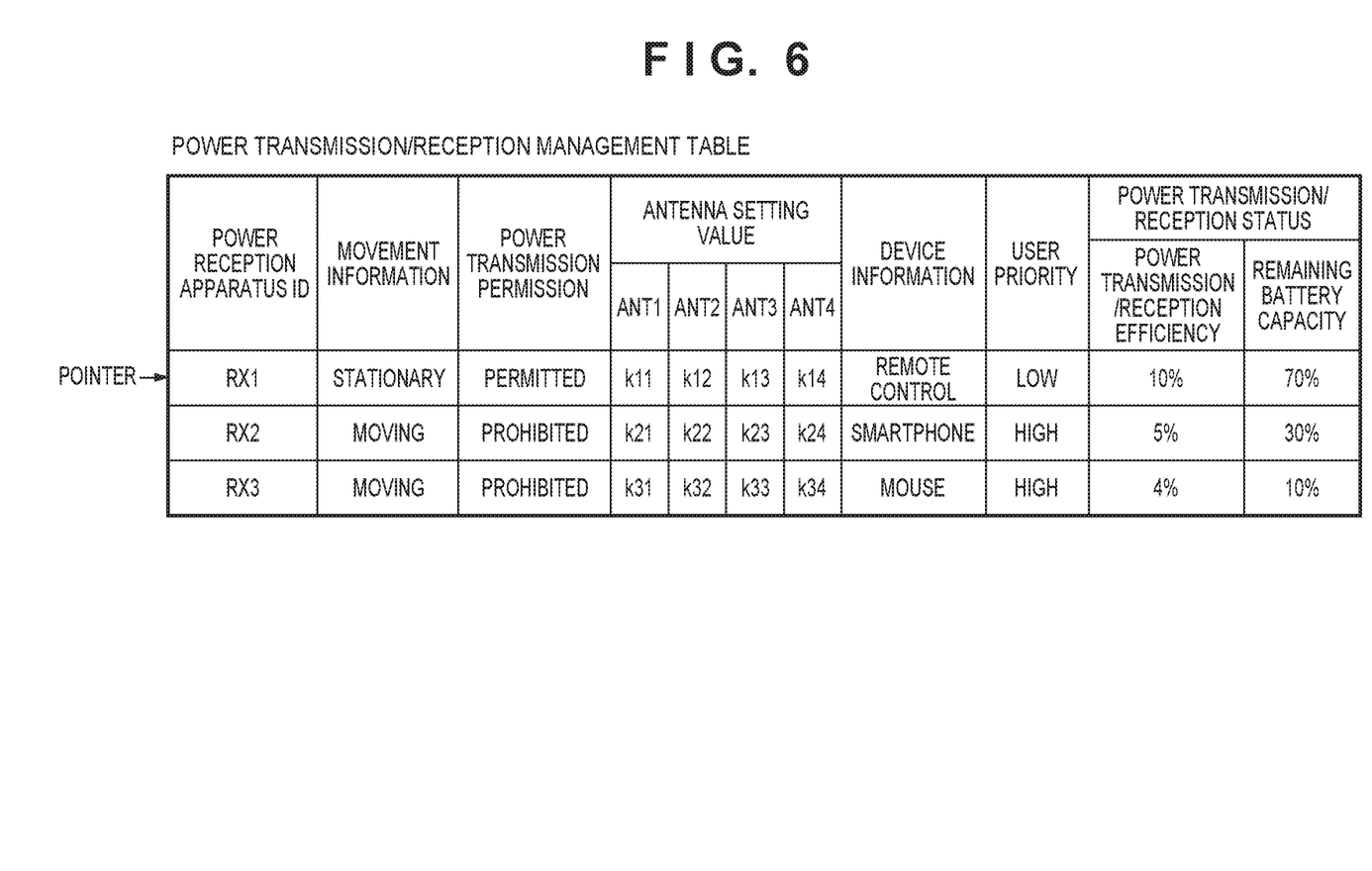
FIG. 6 is a diagram showing a management table that is used in power transmission/reception control according to the embodiment.

Next, the configuration of a power transmission/reception management table (hereinafter, simply called the table) held by the power transmission apparatus 100 will be described with reference to FIG. 6. Note that the table in FIG. 6 is stored in a memory that is not shown, and the reading and writing of the table is controlled by the CPU of the control unit 101.

Information is managed in one horizontal row of the table for each power reception apparatus (RX), and power reception apparatuses (RX) that have completed authentication related to power transmission/reception are registered in the table. Also, if a power reception apparatus (RX) has completed charging or does not need power transmission, it is deleted from the table. In the example in FIG. 6, three power reception apparatuses RX1, RX2, RX3 are currently registered.

Next, parameters regarding the power reception apparatuses (RX) will be described.

"Power reception apparatus ID" is a name for identifying each power reception apparatus (RX), and unique information such as the communication addresses of the power reception apparatuses (RX) is used as the power reception apparatus IDs, for example.

"Movement information" indicates whether the power reception apparatus (RX) is stationary or moving. This parameter is a parameter that is detected by the acceleration detection unit 206 of the power reception apparatus (RX) and transmitted from the power reception apparatus (RX) by wireless communication. Also, instead of a binary parameter that indicates movement or no movement, if it is possible to acquire a multi-value parameter that indicates a speed from the power reception apparatus (RX), such a parameter is more effective.

"Power transmission permission" is a flag that indicates whether or not the transmission of power to the power reception apparatus (RX) is permitted, where "permitted" indicates that power transmission is permitted, and "prohibited" indicates that power transmission is stopped (temporarily). If there are multiple power reception apparatuses (RX) for which power transmission is permitted, power transmission is performed according to a predetermined sequence, and a shift to the power transmission prohibited state is made in accordance with a predetermined condition. In the case of the power transmission prohibited state, as long as a predetermined condition is not satisfied, power transmission does not become permitted, and power transmission remains prohibited. The movement information is particular related to the predetermined condition, and this will be described in detail later.

"Antenna setting value" is a coefficient for setting the gain and the phase for the antennas that constitute the array antenna 108, and the directivity of radio waves emitted from the array antenna 108 can be controlled by this setting. By receiving a CAL signal from a power reception apparatus (RX) with the same array antenna 108, it is possible to calculate the setting for transmission with a DSP or the like. Although four (four sets of) coefficients are shown in FIG. 6, the same number of coefficients as the number of antennas that constitute the array antenna 108 is needed.

"Device information" indicates the type of device, such as a smartphone, a mouse, or a remote control, but may include a different parameter related to power, such as the power reception capacity or power consumption. These pieces of information are included in information that is transmitted from the power reception apparatus (RX) at the time of authentication. Although described later, such information can also be used as a parameter for determining whether power transmission is permitted.

"User priority" indicates a priority pertaining to power transmission/reception that can be set by a user operation, and can be used as a parameter for determining power transmission permission. Two cases are conceivable for the setting of the user priority, namely the case where it is set in the power reception apparatus (RX) and notified to the power transmission apparatus at the time of authentication, and the case where it is set in the power transmission apparatus 100.

"Power transmission/reception status" is a parameter related to power received by the power reception apparatus (RX), and includes the power transmission/reception efficiency and the battery remaining capacity, for example. These parameters are parameters that change during power transmission, and although these parameters are normally used by the power transmission apparatus 100 to monitor the power reception state of the power reception apparatus (RX), they can also be used for determining power transmission permission.

Note that the power transmission/reception efficiency is the ratio between transmitted power and received power as described above, and the information that is actually transmitted by the power reception apparatus (RX) is the amount of received power.

Lastly, the pointer on the left side that indicates one of the power reception apparatuses (RX) indicates which power reception apparatus (RX) is currently receiving power in the case where there are multiple power reception apparatuses (RX) in the power transmission permitted state, such that power transmission is not performed consecutively for the same power reception apparatus (RX). When power transmission ends for the indicated apparatus, processing moves to the next power reception apparatus (RX).

The table described above is referenced by the control unit 101 in power transmission processing that will be described below with reference to FIG. 7.

Power Transmission Apparatus Operations

Next, operations in power transmission processing performed by the power transmission apparatus 100 of the present embodiment will be described with reference to FIG. 7.

Figure 7:
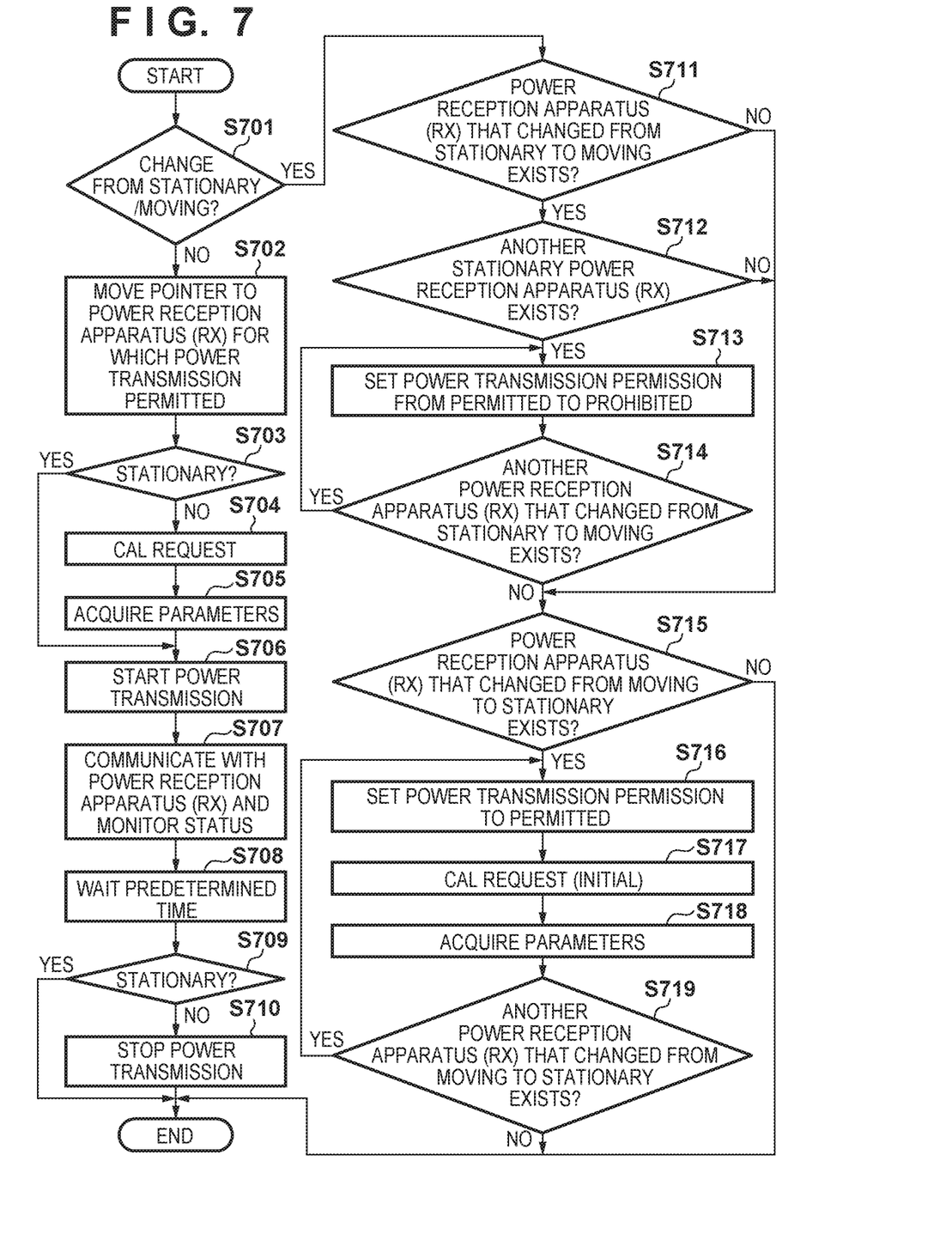
FIG. 7 is a flowchart showing power transmission processing performed by the power transmission apparatus according to the embodiment.

The processing in FIG. 7 is realized by the CPU of the control unit 101 executing a control program stored in a memory. Hereinafter, it is assumed that the authentication of several power reception apparatuses 200 has ended, and that information regarding each power reception apparatus (RX) is registered in the table in FIG. 6.

In step S701, the control unit 101 references the table in FIG. 6 that is stored in the memory, and determines whether the power reception apparatuses (RX) registered in the table have begun moving from the stationary state, or changed from the moving state to stationary. The control unit 101 advances the processing to step S711 in the case of determining that the movement information has changed for a power reception apparatus (RX), and advances the processing to step S702 in the case of determining that the movement information has not changed for any of the apparatuses.

The processing of steps S702 to S710 is processing performed in the case where the movement information has not changed for any of the power reception apparatuses (RX), and the processing of steps S711 to S719 is processing in the case where the movement information has changed for a power reception apparatus (RX).

First, processing the case where the movement information has not changed for any of the power reception apparatuses (RX) will be described.

In step S702, the control unit 101 moves the pointer in the table in FIG. 6 downward one row at a time, and stops the pointer at a power reception apparatus (RX) for which power transmission is permitted.

In step S703, the control unit 101 determines whether or not the power reception apparatus (RX) in the row indicated by the pointer in the table in FIG. 6 is "stationary", and in the case of determining that the apparatus is stationary, advances the processing to step S706. This corresponds to the case where the CAL processing of steps S704 and S705 is omitted. Also, in the case of determining that the power reception apparatus (RX) at the pointer row is moving, the control unit 101 advances the processing to step S704.

In step S704, the control unit 101 transmits a CAL signal transmission request to the power reception apparatus (RX) in the pointer row. The input/output switching unit 107 is switched to the reception side, and the array antenna 108 and the direction detection unit 106 are connected to each other.

In step S705, when the power reception apparatus (RX) in the pointer row performs CAL output, the CAL signal is received by the array antenna 108, and the direction from which the CAL signal radio waves arrived is calculated by the direction detection unit 106. The calculation result is recorded as antenna setting values in the table in FIG. 6 as a parameter for each antenna. These values correspond to values set in the beam forming unit 105 in order to emit radio waves in the same direction as the direction from which the CAL signal radio waves arrived.

In step S706, at the same time as switching the input/output switching unit 107 to the output side, the control unit 101 reads out the antenna setting values in the table in FIG. 6, and sets the values in the beam forming unit 105. Thereafter, the control unit 101 controls the power transmission unit 104 so as to start the transmission of power from the array antenna 108 to the power reception apparatus (RX) in the pointer row.

During power transmission, in step S707, the control unit 101 periodically performs communication with the power reception apparatus (RX) via the communication unit 102 and the communication antenna 103 so as to monitor the most recent status, and updates the table in FIG. 6. The status information transmitted from the power reception apparatus (RX) includes information such as the amount of received power and the battery remaining capacity, and the power transmission apparatus 100 obtains the power transmission/reception efficiency by calculating the ratio of the power received by the power reception apparatus (RX) and the power transmitted by the power transmission apparatus 100.

Next, in step S708, the control unit 101 waits until a predetermined power transmission period is reached, and then advances the processing to step S709.

In step S709, the control unit 101 references the table in FIG. 6 and determines whether or not the power reception apparatus (RX) in the pointer row is stationary. Here, in the case of determining that the power reception apparatus (RX) in the pointer row is stationary, the control unit 101 ends this processing without stopping power transmission in step S710, and in the case of determining that the apparatus is moving, the control unit 101 advances the processing to step S710, stops power transmission, and then ends this processing. Power transmission is not stopped in the case of determining in step S709 that the apparatus is stationary in order to prevent the interruption of power transmission in the case where only one power reception apparatus (RX) is stationary.

The processing in FIG. 7 is repeatedly performed at a predetermined cycle, and if the movement information does not change for any of the power reception apparatuses (RX), power transmission is sequentially performed for the power reception apparatuses (RX) for which power transmission is permitted in the table in FIG. 6. In the case of a power reception apparatus (RX) that is in the power transmission permitted state and is also "moving", CAL processing is performed in steps S704 and S705 every time before performing power transmission.

Next, processing the case where the movement information has changed for a power reception apparatus will be described.

In the processing in steps S711 to S719, if the movement information has changed for even one of the power reception apparatuses (RX) registered in the table in FIG. 6, power transmission is not performed after merely performing CAL processing and updating of the table in FIG. 6.

In step S711, the control unit 101 determines whether or not even one power reception apparatus (RX) has made a change from the stationary state to the moving state in the table in FIG. 6, advances the processing to step S715 in the case of determining that none of the apparatuses have made such a change, and advances the processing to step S712 in the case of determining that any of the apparatuses has made such a change.

In step S712, the control unit 101 determines whether another stationary power reception apparatus (RX) is included in the table in FIG. 6, advances the processing to step S713 in the case of determining that such an apparatus is included, and advances the processing to step S715 in the case of determining that such an apparatus is not included.

In step S713, the control unit 101 changes the power transmission permission of the first power reception apparatus (RX) that changed to the moving state from permitted to prohibited, and then advances to step S714.

In step S714, the control unit 101 determines whether another power reception apparatus (RX) that changed to the moving state is included, advances the processing to step S715 in the case of determining that such an apparatus is not included, and returns the processing to step S713 in the case of determining that such an apparatus is included. Accordingly, if even one power reception apparatus (RX) is stationary, the power transmission permission is changed to power transmission prohibited for all of the power reception apparatuses (RX) that changed to the moving state.

In step S715, the control unit 101 references the table in FIG. 6 and determines whether or not even one power reception apparatus (RX) that changed from the moving state to the stationary state is included. The control unit 101 ends this processing in the case of determining that no power reception apparatus (RX) changed to the stationary state, and advances the processing to step S716 in the case of determining that even one apparatus changed to the stationary state.

In step S716, the control unit 101 sets the power transmission permission to permitted for the first power reception apparatus (RX) that changed to the stationary state. Note that even in the case where the power reception apparatus (RX) is in the moving state, it is possible that power transmission has been permitted, and therefore it is possible that the power transmission permission is set from permitted to permitted.

In step S717, the control unit 101 requests the power reception apparatus (RX) to output a CAL signal. This corresponds to the first instance of CAL processing after the change from the moving state to the stationary state, and thereafter CAL processing is not performed until a change to the moving state is made.

In step S718, the control unit 101 receives the CAL signal and updates the antenna setting values for the power reception apparatus (RX) that is output source. Note that this processing is similar to step S705.

In step S719, the control unit 101 determines whether another power reception apparatus (RX) that changed to the stationary state is included, ends this processing in the case of determining that such an apparatus is not included, and returns the processing to step S716 in the case of determining that such an apparatus is included.

By repeatedly performing the above processing, CAL processing is performed for all of the power reception apparatuses (RX) that changed from the moving state to the stationary state, and the antenna setting values in the table in FIG. 6 are updated.

Note that the processing in FIG. 7 is repeatedly performed at a predetermined cycle, and therefore a power reception apparatus (RX) for which the power transmission permission was updated to permitted in the table in FIG. 6 in the processing of steps S711 to S719 will be the target of power transmission in the processing of steps S701 to S710 in subsequent processing.

Next, the updating of the movement information of a power reception apparatus (RX) in FIG. 7 will be described. The movement information of the power reception apparatuses (RX) is acquired by a separate communication task (the flow of this task is not shown in FIG. 7) that is always operating in parallel with the processing flow in FIG. 7. In this communication task, polling for requesting movement information may be successively repeated for the power reception apparatuses (RX), or only the power reception apparatuses (RX) for which the movement information changed may transmit the movement information by interrupt transmission. Note that the movement information is transmitted from the communication antenna 203, and therefore this transmission can be freely implemented regardless of the power transmission state. In any case, in order to execute the flow in FIG. 7, it is important that the movement information is updated to the most recent information as quickly as possible for all of the power reception apparatuses (RX) that are registered in the table in FIG. 6.

Power Reception Apparatus Operations

Next, operations in power reception processing performed by the power reception apparatus 200 of the present embodiment will be described with reference to FIG. 8.

Figure 8:
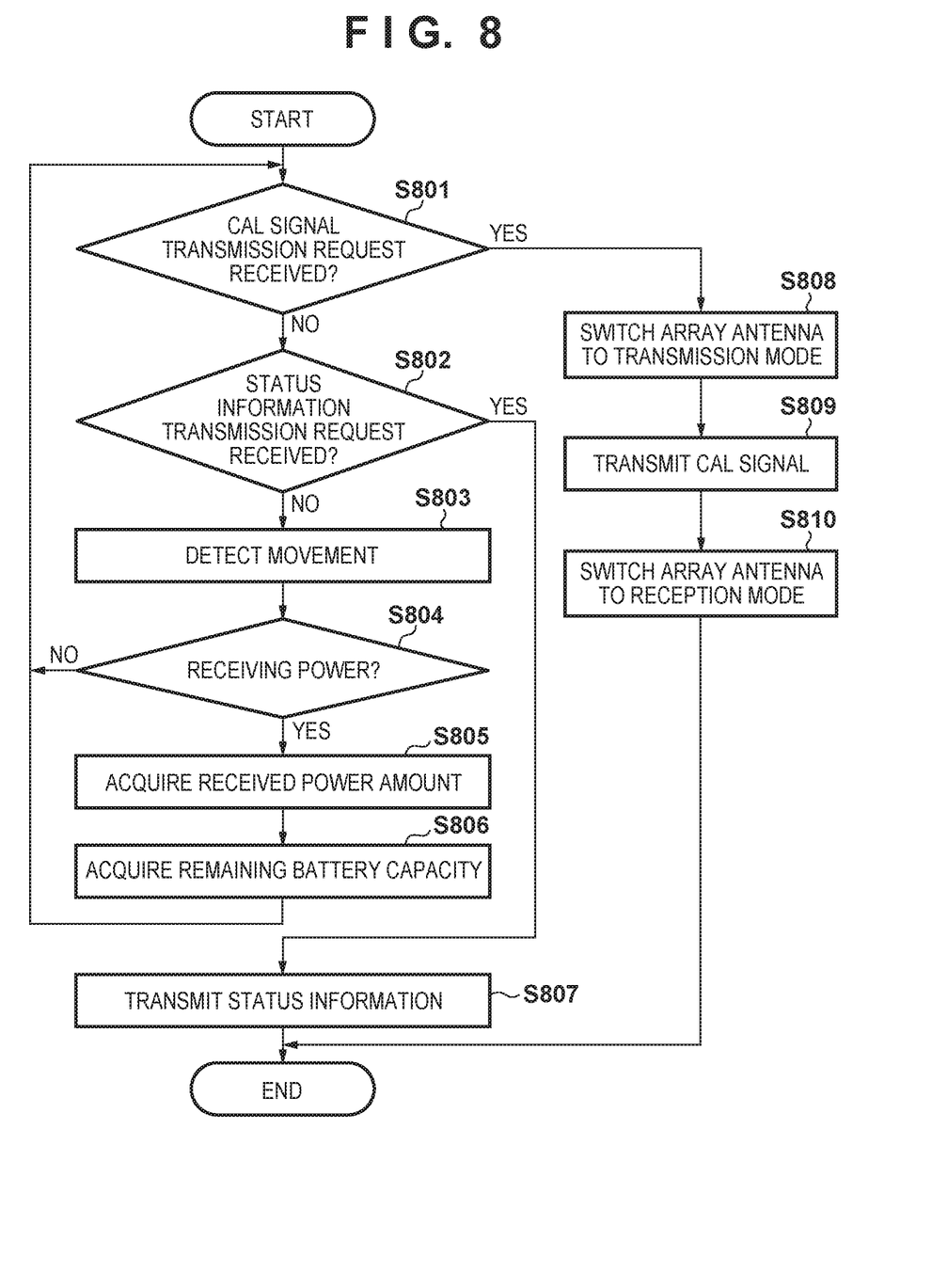
FIG. 8 is a flowchart showing power reception processing performed by the power reception apparatus according to the embodiment.

The processing in FIG. 8 is realized by the CPU of the control unit 201 executing a control program stored in a memory. In the following, it is assumed that authentication of the power reception apparatus 200 has ended, and that information regarding the power reception apparatus (RX) is registered in the table in FIG. 6.

In step S801, the control unit 201 determines whether or not a CAL signal transmission request has been received via the communication unit 202 and the communication antenna 203, advances the processing to step S808 in the case of determining that such a request has been received, and advances the processing to step S802 in the case of determining that such a request has not been received.

In step S802, the control unit 201 determines whether or not a status information transmission request has been received from the power transmission apparatus 100 via the communication unit 202 and the communication antenna 203, advances the processing to step S807 in the case of determining that such a request has been received, and advances the processing to step S803 in the case of determining that such a request has not been received.

In step S803, the control unit 201 acquires acceleration information from the acceleration detection unit 206, detects movement of the power reception apparatus (RX), and holds movement information indicating whether the power reception apparatus (RX) is stationary or moving in a memory.

In step S804, the control unit 201 determines whether or not power is currently being received by the power reception unit 204, returns the processing to step S801 in a case of determining that power is not being received, and advances the processing to step S805 in a case of determining that power is being received.

In step S805, the control unit 201 acquires the amount of power that is currently being received from the power reception unit 204, and holds this amount in the memory.

In step S806, the control unit 201 acquires the battery remaining capacity from the power reception unit 204, and holds the battery remaining capacity in the memory. Thereafter, the procedure returns the processing to step S801, and processing is repeated from step S801.

In step S807, the control unit 201 transmits the movement information, the amount of received power, and the battery remaining capacity, which are held in the memory, to the power transmission apparatus 100 as status information, and then ends this processing.

In step S808, the control unit 201 controls the input/output switching unit 207 so as to connect the array antenna 208 and the calibration transmission unit 205 and switch the array antenna 208 to the transmission mode.

In step S809, the control unit 201 transmits the CAL signal using radio waves at a predetermined level via the array antenna 208. Note that the radio wave level may be designated in the CAL signal transmission request from the power transmission apparatus 100.

In step S810, the control unit 201 controls the input/output switching unit 207 so as to re-connect the array antenna 208 and the power reception unit 204 and return the array antenna 208 to the reception (power reception) mode, and then ends this processing.

Note that the processing in FIG. 8 is repeatedly performed at a predetermined cycle.

In this way, after power transmission/reception authentication is performed with the power transmission apparatus 100, the array antenna 208 of the power reception apparatus 200 is set to the transmission mode only for the period for transmitting the CAL signal, and is set to the reception (power reception) mode in all other periods. Accordingly, the power reception apparatus 200 can always receive power that is transmitted from the power transmission apparatus 100 after the CAL signal has been received.

As described above, in the present embodiment, a stationary power reception apparatus is prioritized, and the transmission of power to a moving power reception apparatus is prohibited. Alternatively, the execution frequency of CAL processing in the case of transmitting power to a stationary power reception apparatus is set lower than that in the case of transmitting power to a moving power reception apparatus. By performing control in this way, it is possible to improve the power transmission/reception efficiency of the overall system.

Second Embodiment

In the first embodiment, power transmission permission and the execution frequency of CAL processing are controlled in accordance with changes in the movement information of one or more power reception apparatuses (RX). In contrast, in the present embodiment, control is performed additionally in accordance with another condition that is related to the parameters in the table in FIG. 6. Specifically, the table in FIG. 6 is referenced, and in accordance with several parameters in the table, the power reception apparatuses (RX) are classified as a high priority apparatus (type 1) or a low priority apparatus (type 2). A high priority apparatus is a power reception apparatus to which power is to be transmitted even when moving, and for which power transmission is to be permitted regardless of the stationary/moving state.

Figure 9:
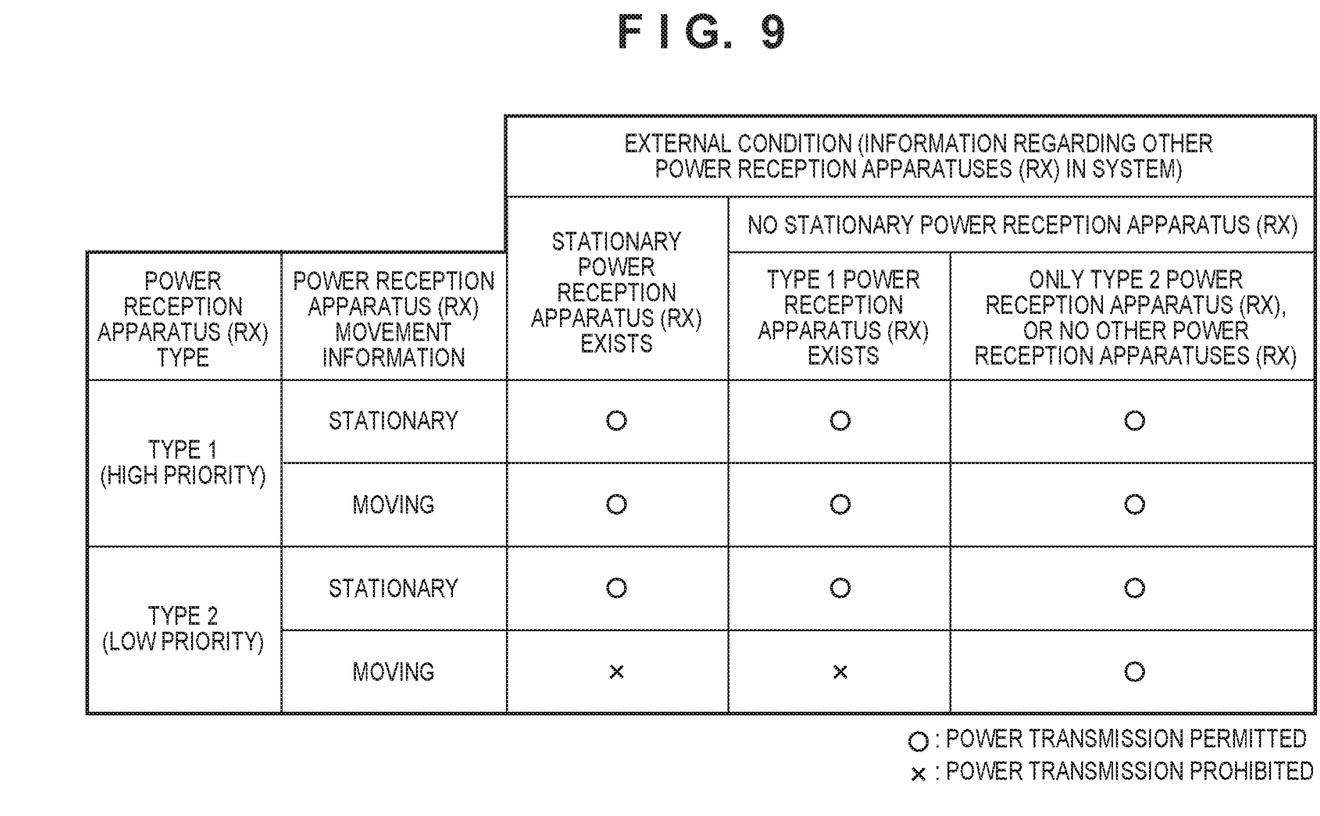
FIG. 9 is a diagram illustrating conditions for determining whether or not power transmission is permitted in a second embodiment.

FIG. 9 shows an example of conditions for determining power transmission permission in the case where power reception apparatuses are classified by priority. In FIG. 9, the vertical headers indicate the priority and movement information, which are conditions determined by the power reception apparatus (RX). The horizontal headers indicate external conditions, that is to say information regarding other power reception apparatuses (RX) in the system.

The following describes the relationship between the apparatus priorities and parameters in the table in FIG. 6.

Device type is included as device information. A device thought to be generally important to a user, such as a smartphone, is classified as type 1. Also, a remote control is often relatively stationary, and does not require urgent power transmission when moving (during use), and therefore is classified as type 2. A mouse (wireless mouse) or the like also corresponds to type 2.

The power reception capacity and the power consumption described above are also included as other device information. A conceivable example of such a low-power device is a sensor device that does not have an internal battery and operates directly using transmitted power. Such a device often only has operational significance when in motion, and therefore is classified as type 1. On the other hand, a high-power apparatus is classified as type 2 in view of placing importance on efficiency.

A user priority is not automatically set based on general information, but rather is set manually by individual users.

Next, in the case of using the power transmission/reception efficiency parameter in the power transmission/reception status, rather than using the real-time efficiency during power transmission, a history of efficiency is integrated. If this integral value is greater than or equal to a predetermined value, the apparatus is classified as type 1. It is also reasonable for an apparatus for which the battery remaining capacity is less than or equal to a predetermined value to be prioritized and classified as type 1.

The power transmission/reception status includes dynamic values that change over time, and therefore there is a possibility that the priority will also change accordingly.

A stationary or high priority power reception apparatus is set to power transmission permitted. A low priority moving power reception apparatus is basically set to power transmission prohibited, but is set to power transmission permitted if the other power reception apparatuses are all type 2 and all moving. Also, of course if there is only one power reception apparatus, the apparatus is set to power transmission permitted regardless of the conditions.

Lastly, an example of performing exception processing will be described.

A case is conceivable in which there is a power reception apparatus (RX) that is registered in the table in FIG. 6 and has a low power transmission/reception efficiency over a long period of time regardless of being stationary. One example is the case where the power transmission apparatus 100 and a power reception apparatus (RX) are at distant locations and can communicate, but are too distant for power transmission. Another example is the case where a fixed obstacle is located between the power transmission apparatus 100 and a power reception apparatus (RX). In such a situation, needless power transmission is repeatedly performed with respect to the power reception apparatus (RX), and efficiency decreases for the overall system as well. As a countermeasure for this, a parameter that counts the continuing duration of the state where the power transmission/reception efficiency falls below a predetermined value is added to the table in FIG. 6. If this parameter reaches a predetermined value, information regarding that power reception apparatus (RX) is deleted from the table, and a warning indicating the deletion is notified to the power reception apparatus (RX) by wireless communication. Upon receiving the warning, the power reception apparatus (RX) ends power reception or transmits a power transmission request again.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-074749, filed Apr. 4, 2017, which is hereby incorporated by reference herein in its entirety.

What is claimed is:

1. A power transmission apparatus comprising:
a plurality of antennas;
a reception unit configured to receive a signal from a power reception apparatus; and
a control unit configured to control output from the antennas such that power is wirelessly supplied to the power reception apparatus from the antennas,
wherein the control unit alternately repeats determination processing for determining output from the antennas based on a signal received by the reception unit, and power transmission processing for wirelessly outputting power from the antennas in accordance with the output determined in the determination processing, and the control unit controls an execution frequency of the determination processing based on whether or not the power reception apparatus is moving.

2. A control method of a power transmission apparatus which has a plurality of antennas, a reception unit configured to receive a signal from a power reception apparatus, and a control unit configured to control output from the antennas such that power is wirelessly supplied to the power reception apparatus from the antennas, the method comprising:
alternatingly repeating execution of determination processing for determining output from the antennas based on a signal received by the reception unit, and execution of power transmission processing for wirelessly outputting power from the antennas in accordance with the output determined in the determination processing, and
controlling an execution frequency of the determination processing based on whether or not the power reception apparatus is moving.

3. A non-transitory computer-readable storage medium storing a program for causing a computer to execute a control method of a power transmission apparatus which has a plurality of antennas, a reception unit configured to receive a signal from a power reception apparatus, and a control unit configured to control output from the antennas such that power is wirelessly supplied to the power reception apparatus from the antennas, the method comprising:
alternatingly repeating execution of determination processing for determining output from the antennas based on a signal received by the reception unit, and execution of power transmission processing for wirelessly outputting power from the antennas in accordance with the output determined in the determination processing, and
controlling an execution frequency of the determination processing based on whether or not the power reception apparatus is moving.

4. The apparatus according to claim 1, wherein the control unit performs control such that, in a case of transmitting power to a power reception apparatus that is moving, the determination processing is executed before the power transmission processing is executed, and in a case of transmitting power to a power reception apparatus that is not moving, the determination processing is executed before the power transmission processing is executed, and thereafter the power transmission processing is executed without performing the determination processing until a state in which the power reception apparatus is not moving changes to a state in which the power reception apparatus is moving.

5. The apparatus according to claim 1, wherein the control unit performs control such that in a case of transmitting power to a power reception apparatus that is not moving, if a state in which the power reception apparatus is moving changes to a state in which the power reception apparatus is not moving, the determination processing is executed, and thereafter the determination processing is not executed until a state in which the power reception apparatus is not moving changes to a state in which the power reception apparatus is moving.

6. The apparatus according to claim 1, wherein
in a case of transmitting power to the plurality of power reception apparatuses, the control unit switches a power reception apparatus to which power is transmitted at a predetermined cycle while the power transmission processing is being executed, and
in a case of transmitting power to a power reception apparatus that is moving, the control unit performs the determination processing each time power transmission is to be executed, and in a case of transmitting power to a power reception apparatus that is not moving, the control unit performs the determination processing and thereafter repeatedly performs the power transmission processing.

7. The apparatus according to claim 1, wherein the control unit performs control such that transmission of power to a power reception apparatus that is not moving is prioritized, and transmission of power to a power reception apparatus that is moving is stopped.

8. The apparatus according to claim 7, wherein the control unit performs control such that even in a case of a power reception apparatus that is moving, power is transmitted to the power reception apparatus that is moving if a power reception apparatus that is not moving is not included among other power reception apparatuses.

9. The apparatus according to claim 7, wherein
the control unit sets a priority for each of the plurality of power reception apparatuses, and
the control unit performs control such that even in a case of a power reception apparatus that is moving, power is transmitted to the power reception apparatus that is moving if the power reception apparatus that is moving is a power reception apparatus for which a first priority has been set.

10. The apparatus according to claim 9, further comprising a communication unit,
wherein the priority is determined based on a device type that is acquired from the power reception apparatuses via the communication unit.

11. The apparatus according to claim 9, further comprising a communication unit,
wherein the priority is determined based on a power reception capacity or a power consumption that is acquired from the power reception apparatuses via the communication unit.

12. The apparatus according to claim 9, further comprising a communication unit,
wherein the priority is determined based on a status regarding power transmission/reception that is acquired from the power reception apparatuses via the communication unit.

13. The apparatus according to claim 9, wherein the priority is set based on a user operation.

14. The apparatus according to claim 9, wherein the control unit performs control such that in a case of a power reception apparatus that is moving, even if a second priority that is lower than the first priority has been set for the power reception apparatus that is moving, power is transmitted to the power reception apparatus that is moving if another power reception apparatus is not present, or if another power reception apparatus that is not moving is not present, and a power reception apparatus for which the first priority has been set is not present.

15. The apparatus according to claim 1, further comprising a communication unit configured to communicate with the plurality of power reception apparatuses, wherein the control unit receives movement information from the plurality of power reception apparatuses via the communication unit and determines whether the power reception apparatuses are moving or not moving based on acceleration information or a movement speed included in the movement information.

16. The apparatus according to claim 15, wherein the control unit sets an interval in which the determination processing is executed so as to be shorter the higher the movement speed is.

17. The apparatus according to claim 1, further comprising a communication unit,
wherein the control unit obtains a power transmission/reception efficiency from a ratio of power transmitted from the power transmission apparatus and power received by the power reception apparatus, and
in a case where the power transmission/reception efficiency of a power reception apparatus among the power reception apparatuses falls below a predetermined value in a predetermined period, the communication unit issues a warning to the power reception apparatus and stops transmission of power to the power reception apparatus.

18. The apparatus according to claim 1, wherein
the determination processing is processing in which a signal for adjusting a directivity of an antenna of the power transmission unit is received from the power reception apparatuses, and
the control unit sets the directivity of the antenna to a power reception apparatus direction that is obtained based on the signal.

* * * * *